Figures 1, 2, 3:
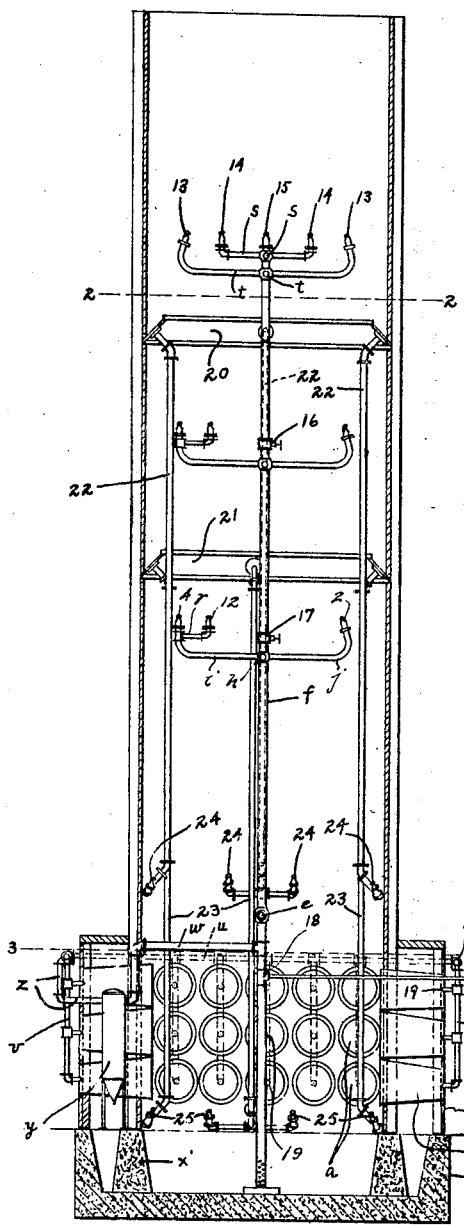

May 25, 1926.

C. E. GREENE

SPRAY TOWER

Filed April 21, 1921

1,586,083

INVENTOR
Charles E. Greene
by Wright Brown Quinby Tray
ATTORNEYS

Patented May 25, 1926.

1,586,083

UNITED STATES PATENT OFFICE.

CHARLES E. GREENE, OF WINCHESTER, MASSACHUSETTS, ASSIGNOR TO E. B. BADGER AND SONS COMPANY, OF BOSTON, MASSACHUSETTS, A CORPORATION OF MASSACHUSETTS.

SPRAY TOWER.

Application filed April 21, 1921. Serial No. 463,118.

This invention relates to cooling water by evaporation and heat conduction in contact with air. Water used in large volume for cooling purposes, as for condensing steam in a steam plant, cooling floors and metal fittings in and around steel mills and furnaces, and analogous uses, in situations where the available supply of water is limited, must be itself cooled and used again and again in order to reduce the waste of water to the minimum. The most efficient mode of cooling water in such large volumes as we are here concerned with is by ejecting the water in the form of spray into the surrounding air, whereby evaporation and conduction rapidly lower the temperature of the water, and all except that small proportion of the water which is evaporated by its inherent heat falls into a collection tank or pond, sensibly reduced in temperature and in condition for further use as a cooling agent. My present object has been to produce a water cooling apparatus of small horizontal area but efficient to effect rapid cooling of large quantities of water. The apparatus by which this object is accomplished has the form of a tower open from top to bottom, into which air is admitted at the bottom and from which such air is expelled from the top after having traversed the height of the tower, and into which the water to be cooled is sprayed at different levels so as to effect an intimate mingling of much water with flowing air. More particularly, a part of my object is to insure inflow of cooling air at the bottom of the tower and up draft within the tower, under all atmospheric conditions and regardless of the force and direction of the winds and other external air currents to which the tower may be exposed.

The principles and characteristics of the invention can best be explained with reference to the following detailed description of a particular embodiment of the invention and to the drawings furnished herewith. In said drawings, Figure 1 is a vertical section of such spray tower taken on line 1—1 of Figure 3.

Figures 2 and 3 are horizontal sections taken on line 2—2 and 3—3 respectively of Figure 1.

Like reference characters designate the same parts in all the figures.

The tower may be built of frames and plates of steel, or partly of wood and partly of steel, or wholly of wood, or of concrete, or any other suitable building material, or may be constructed as a compartment in a building. The construction in which the walls are plates of steel is preferred because of the heat conducting capacity of steel which causes the water gathering on the inside surfaces of the plates to be rapidly cooled. It is preferably open internally from top to bottom with substantially no impediment, that is, no other impediment than the pipes which support and feed the spray nozzles, the gutters hereinafter described, and such gratings or other foot holds as may possibly be provided for the convenience of workmen who may be required to repair or renew the nozzles and piping from time to time. In the base part of the tower are flues $a$ for intake of the cooling air, and such flues are preferably conical with their larger ends inward in order to avoid choking of the flow by expansion of the air. As many of these flues are provided as may be needed, and the design of the tower permits the provision of so great a number that the combined area of all the flues is approximately equal to, or possibly greater than, the transverse area of the tower at its narrowest part. Preferably the flow capacity for air of all the flues is made about equal to that of the tower proper. They are supported by inner and outer walls $c$ and $d$, respectively, and the outer walls are located far enough outside of the inner walls to give suitable support to the outer ends of the flues.

The water to be cooled enters the tower through a pipe $e$ which joins a rising pipe $f$ which, in the arrangement here shown is located in the center of the tower. Spray nozzles are supported at different stages or levels, and are fed with water by this upright pipe. A suitable arrangement of nozzles and piping for each of the lower stages is shown in plan in Figure 2; there being four lateral pipes, namely, $g$, $h$, $i$ and $j$ branching from the rising pipe and carrying nozzles 1, 2, 3 and 4, respectively; and from the ends of the pipes $g$ and $h$ extend branches $k$, $l$, $m$ and $n$, $o$, $p$ which carry upon their respective ends nozzles 5, 6, 7, 8, 9, and 10. The branches $i$ and $j$ have extensions $q$ and $r$ whereon are mounted nozzles 11 and 12. The arrangement of nozzles just described provides a relatively large number at each stage well distributed for thorough scattering of the spray; but other arrangements may be provided according to circumstances. At the uppermost stage are two sets of four equally spaced pipes s and t, respectively, which branch from the upright pipe and carry nozzles 13, 13 and 14, 14 on their ends, and a nozzle 15 is mounted on the extremity of the pipe f. Suitable fittings of any known or other character are used for the purpose of mounting the branch pipes and making communication between them and the rising pipe. Preferably the branch pipes are so located and formed that all of the nozzles in each stage are approximately in the same horizontal plane.

Valves 16 and 17 are located in the rising pipe for shutting off the flow of water to more or less of the nozzles; and another valve 18 is arranged below the intake pipe to control a by-pass channel through which all or a part of the water may be allowed to flow directly into the collecting trough or well at the bottom of the tower at times and under conditions when cooling of the water by spraying is not required.

Flow of air through the intake flues is induced by nozzles 19, of which there is one, or permissibly more than one, for each flue, directed from the outer end of the flue toward the interior of the tower, as clearly shown in Figures 1 and 3. These injector nozzles are supplied with water from a pipe circuit u surrounding the base of the tower and from which lead branches v which are arranged respectively in front of each vertical row of flues, and each branch supports and supplies the nozzles provided for the flues of that row. A pipe line w from the supply pipe e leads to the pipe circuit u through a strainer y and a connection z. The purpose of the strainer here shown is to hold back any sediment which may be carried in the water and prevent the same from plugging up the injection nozzles 19, which nozzles in the apparatus here shown are smaller than the others and more easily stopped. All of the water delivered to the tower may be strained for the same reason, if desired, although it is not essential that this be done.

On the inner walls of the tower are gutters 20 and 21 from which lead respectively pipes 22, 22, 22, and 23, 23, 23. The lower terminal of each of these pipes supports a group of nozzles 24 and 25, respectively. The function of the gutters is to collect the water from the sprays which strikes and runs down on the walls of the tower; and the drain pipes 22 and 23 conduct the water thus collected and cause it to be a second time delivered in the form of sprays from the nozzles 24 and 25 respectively. The nozzles fed from the respective gutters are at different levels in order that the pressure head by which water is forced from each of these sets of nozzles may be approximately the same.

All of the nozzles except the injection nozzles are directed upwardly in order that whatever entraining or flow-inducing effect the sprays delivered from them may have upon the air shall be in the upward direction and toward the outlet at the top of the tower. It is not, however, necessary that the injection nozzles should be exactly horizontal, for they also, and the intake flues may be arranged on an upward inclination to assist in creating an upward draft and to avoid interference with one another of the air currents coming in from different sides of the tower.

It will now be understood that when the water to be cooled is turned into the main supply pipe e and caused to flow into the various sets of spray nozzles, the injection nozzles 19 drive the outer air into the tower from all sides, and the nozzles in the upper part of the tower exert a draft-inducing effort in the upward direction. Hence air is caused to flow in at the bottom of the tower, upwardly through it, and out at the top; and the forces exerted in this manner have been found in practice to be sufficient to cause the desired flow of air under all atmospheric conditions, independently of the direction and force of the wind. The upward draft of air through the tower is but little impeded by falling spray because a large proportion of the water is thrown so far from the nozzles that it reaches the walls of the tower before falling.

In the course of its upward progress the air comes into contact successively with the spray emitted from the different banks of nozzles, becoming progressively heated. Thus the thermo-dynamic effect of warmer and rarer air within than outside of the tower is added to the mechanical entraining effect of the sprays to induce the desired air flow. That part of the spray with which the air comes into contact first after entering the tower is furnished by water collected in the gutters, which has already been sprayed once and been thereby reduced in temperature, whereby there is secured the desirable thermal effect of the cooler air first coming into contact with the cooler water and then into contact with the warmer water; and also that of repeated spraying of the same water. Evidently all of the water, except that unavoidably lost by evaporation, collects at the bottom of the tower and is pumped away for further use as a cooling medium, by means not here shown.

Any sort of tank or trough or well may be provided at the base of the tower for collection of the water. Here I have shown a concrete basin $x$ and in which are provided piers $x'$ to support the frame of the tower.

Spray towers embodying the principles here disclosed and claimed may be made with wide variation of proportions and dimensions. I may say, however, that successful results have been obtained with a tower approximately thirty-five feet in height and with interior horizontal dimensions of eight feet in each direction, the arrangement of intake flues and nozzles being as here shown.

What I claim and desire to secure by Letters Patent is:

1. A water cooling spray tower having interior means for delivering the water to be cooled in the form of spray and having also other means for delivering water in the form of spray constructed and arranged to cause entrainment into the base of the tower of air by the emission as injection spray of a part of the water to be cooled, said water delivering means constituting the sole air-entrainment means of the tower, the tower having an outlet at its top and being open from the base to such outlet.

2. A spray tower having an open interior and an upper outlet, a plurality of substantially horizontal air intake flues of substantial length opening into the base from each of a number of different sides thereof, spray nozzles arranged to discharge water axially through said flues from the outer parts thereof toward the interior of the tower, and spray nozzles within the tower arranged to discharge upwardly.

3. An apparatus for use in cooling water or other liquids by contact with air comprising walls arranged to enclose an upwardly extending passage or chamber having an outlet in its upper part, conducting means for liquid entering said space and having branched outlets at different levels, said outlets being formed by nozzles constructed with provision for emitting liquid in the form of spray and being upwardly directed, a gutter traversing the enclosing walls within such space arranged to catch that part of the spray which strikes the walls, conductors leading from said gutter to the lower part of said space, spray nozzels connected to said conductors arranged to discharge in the form of a spray the liquid delivered to said conductors, and means for inducing flow of air into the lower part of said space by inwardly directed spray nozzles and flues through which the last named sprays are directed.

4. A spray tower having confined air intake flues in its base part, nozzles arranged to direct liquid in the form of spray through said flues from without to within the tower, nozzles arranged within the tower for ejecting the liquid to be cooled as an upwardly directed spray, and means for collecting liquid thus discharged and spraying it a second time into the current of air traversing the tower.

5. A spray tower comprising walls forming an upright chamber or channel, and having an air inlet at the bottom and an air outlet at the top, means for delivering water to be cooled into the interior of said tower in upwardly directed sprays and means for collecting water lodging on the walls of said tower, conducting such water downward and delivering it in the form of spray in the region of the said air inlet, whereby air entering the tower is first brought into contact with the cooler water delivered from the last-named means and is then brought into contact with warmer water and heated in the course of its upward travel through the tower.

6. A spray tower for cooling water having a series of confined intake flues for air arranged around the lower part thereof, opening laterally into the interior thereof but mainly outside the interior area of the tower, and an outlet at its top, a nozzle in each of said flues arranged for directing water to be cooled as spray through said flues from the outer toward the inner parts thereof, and other nozzles arranged for discharging the water to be cooled as spray in the upper interior parts of the tower.

In testimony whereof I have affixed my signature.

CHARLES E. GREENE.